Sept. 15, 1936.  G. B. RANDOLPH  2,054,713
MOBILE SWEEPER
Filed Feb. 9, 1935  2 Sheets-Sheet 2
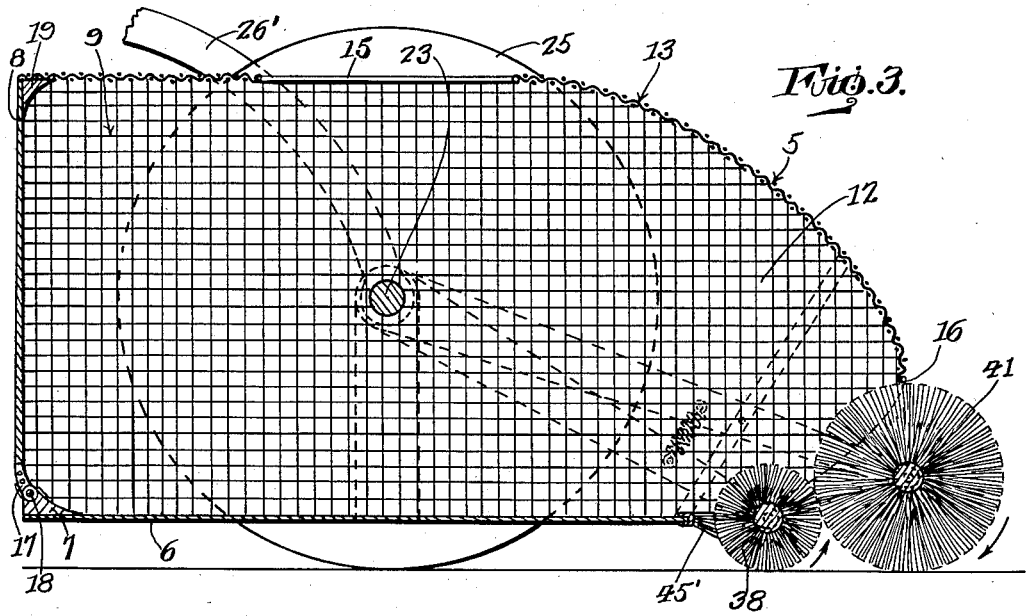
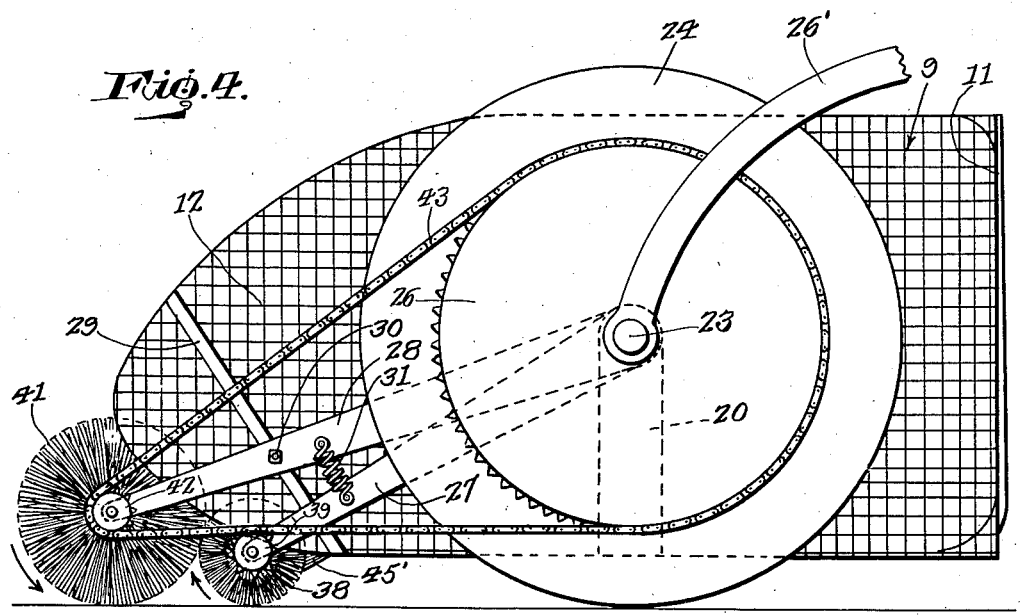
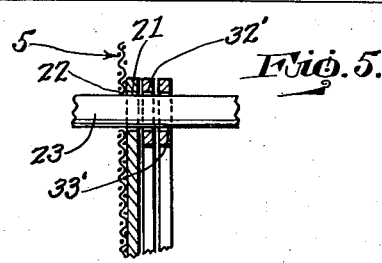
Inventor
George B. Randolph Patented Sept. 15, 1936

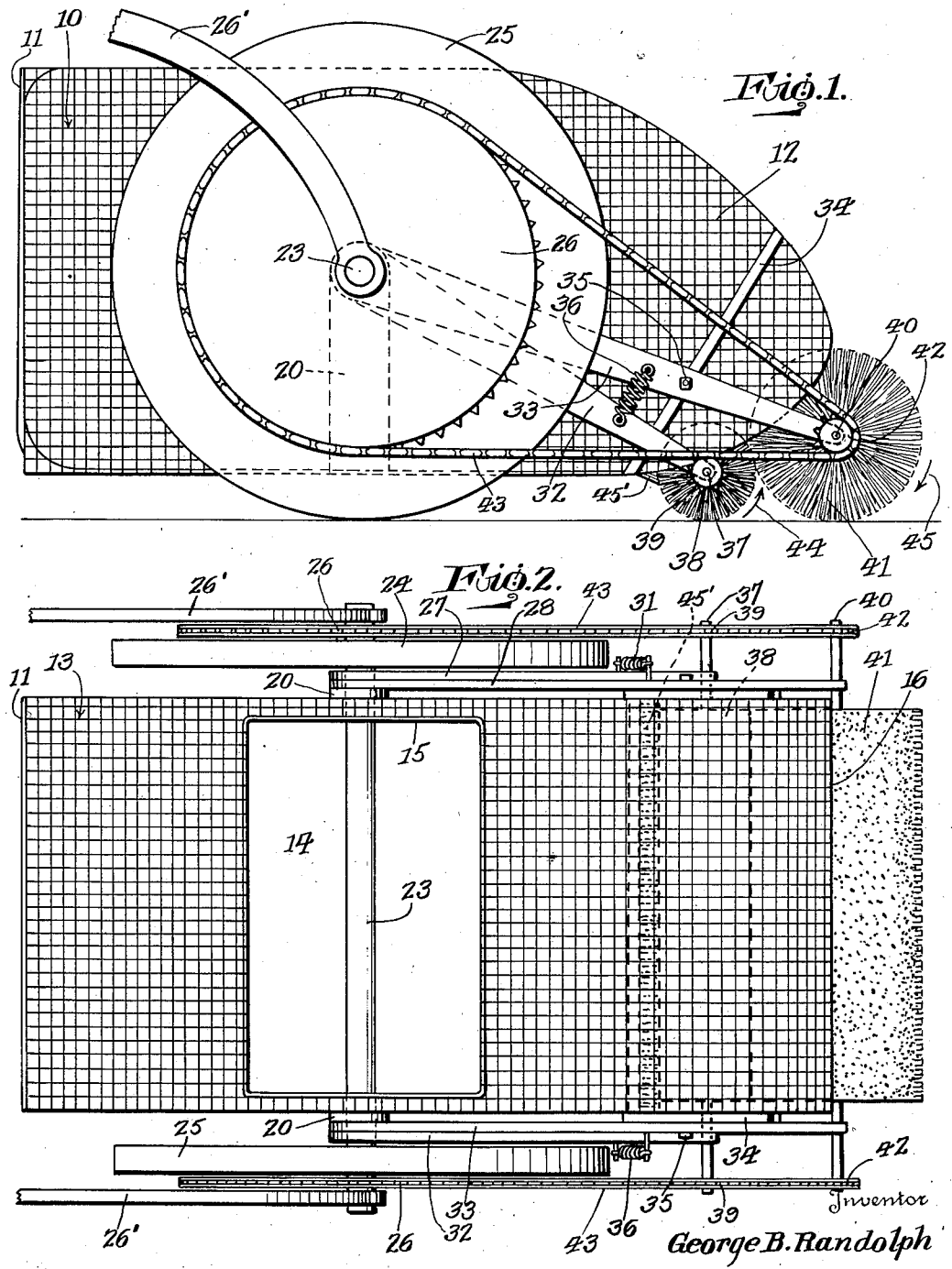

2,054,713

UNITED STATES PATENT OFFICE 2,054,713

MOBILE SWEEPER

George B. Randolph, San Antonio, Tex.

Application February 9, 1935, Serial No. 5,802

2 Claims. (Cl. 15—79)

My invention relates to a mobile sweeper designed primarily for the sweeping of lawns, but it is to be understood that it may be used in any connection for which it may be found applicable, and the invention has for its primary object to provide, in a manner as hereinafter set forth, a sweeper of the class referred to for thoroughly cleaning a lawn of leaves and cut grass and for collecting the sweepings during its travel.

Further objects of the invention are to provide, in a manner as hereinafter set forth, a sweeper for the purpose set forth which is comparatively simple in its construction and arrangement, strong, durable, compact, thoroughly efficient in its use, conveniently repaired when occasion requires, readily assembled and comparatively inexpensive to manufacture.

To the above ends essentially, and to others which may hereinafter appear, the invention consists of such parts and such combination of parts which fall within the scope of the invention as claimed.

In the drawings:

Figure 1 is a fragmentary view in elevation, looking towards one side of the sweeper, Figure 2 is a fragmentary view in top plan, Figure 3 is a longitudinal sectional view of the sweeper, Figure 4 is a view similar to Figure 1 looking towards the other side of the machine, and Figure 5 is a detailed view in vertical section.

The sweeper includes a collecting receptacle 5 formed of an imperforate bottom 6 provided at its rear end with a transversely extending upstanding reinforcing bar 7 of substantially triangular contour in cross section, an imperforate back wall 8 which constitutes a door to permit access to the rear end of the receptacle, a pair of foraminous side walls 9, 10 of greater length than bottom 6, formed with straight rear edges 11 and reduced substantially ovoid forward portions 12, and a foraminous top wall 13 extending from the wall 8 and terminating slightly below the top of the front edge of portions 12. The forward end of wall 13 is spaced from the forward edge of bottom 6. The forward portion of wall 13 is curved to conform to the curvature of the forward portions of the top of the side walls. The wall 13, intermediate its ends, is provided with a transversely disposed rectangular opening 14 having its edges reinforced throughout as at 15. The opening 14 permits access to receptacle 5 from the top thereof for a purpose to be referred to. The arrangement of the bottom 6 and walls 9, 10, 13 relatively to each other provides the lower part of the forward end of receptacle 5 with an opening 16 for a purpose to be referred to. The wall 8 is formed at its bottom with inwardly extending means 17 which is hinged, as at 18, to the top of bar 7. The wall 8, at its top, has secured to its inner face a support 19 which, when the wall 8 is closed, extends between the side walls 9, 10 and supports the rear end of top wall 13.

Fixedly secured to the side walls 9, 10 of receptacle 5 is a pair of vertically disposed parallel flat narrow bars 20 extending upwardly from bottom 6 and of a height less than that of the receptacle. One of these bars is shown in Figure 5. The upper end of each of said bars and each side wall of the receptacle is formed with an opening. The opening in the bar is indicated at 21 and that in the side wall at 22 (Figure 5). The openings 21 in the bars register with the openings 22 in the side walls.

Extending through the registering openings 21, 22 is a rotatable axle 23 projecting outwardly from the side walls of receptacle 5. The axle carries a pair of supporting or drive wheels 24, 25 and a pair of sprocket wheels 26 is arranged outwardly with respect to said wheels. The bars 20 provide bearings for axle 23. Loosely mounted on and suitably connected to the axle 23 are the side members 26' of a handle element not completely shown.

Loosely mounted on the axle 23 between the wheel 24 and a bar 20 is a pair of forwardly extending downwardly inclined arms 27, 28. The arm 27 is of less length than the arm 28 and has its outer end arranged rearwardly of the forward end of receptacle 5. The arm 28 is of a length to extend beyond the forward end of the receptacle 5 and has its outer end arranged above the outer end of arm 27. The side wall 9 has secured to its outer face, in proximity to its forward end, an inclined brace bar 29 to which the arm 28 is anchored, as at 30. The arm 27 is resiliently coupled to arm 28 by a coiled spring 31, the purpose of which will be hereinafter referred to. Loosely mounted on the axle 23 between the drive wheel 25 and the other bar 20 is a pair of forwardly extending downwardly inclined arms 32, 33. The arm 32 is of less length than the arm 33 and has its outer end arranged rearwardly of the forward end of receptacle 5. The arm 33 is of a length to extend beyond the forward end of the receptacle 5 and has its outer end arranged above the outer end of arm 32. The side wall 10 has secured to its outer face, in proximity to its forward end, an inclined brace bar 34 to which the arm 33 is anchored, as at 35. The arm 32 is resiliently coupled to arm 33 by a coiled spring 36 and the purpose of which will be presently referred to.

The arms 27, 32 are arranged outwardly of and depend below the arms 28, 33 respectively. The arms 27, 32, 28 and 33 have openings in their upper ends for the passage of the shaft 23. The opening, with respect to an arm 27 or 32, is indicated at 32' (Figure 5). The opening, with respect to an arm 28 or 33, is indicated at 33' (Figure 5). The arms 27, 32 align with each other and are of like form and length. The arms 28, 33 align with each other and are of like form and length. Journaled in the forward ends of arms 27, 32 is a rotatable brush shaft 37 to which is fixed a brush 38 which travels upon the surface being cleaned and extends into the opening 16. The latter constitutes the intake for receptacle 5. Each end of shaft 37 carries a vertically disposed sprocket pinion 39. Journaled in the forward end of the arms 28, 33 is a rotatable brush shaft 40 to which is fixed a brush 41 which travels upon the surface being cleaned and extends into the opening 16. Each end of shaft 40 carries a vertically disposed sprocket pinion 42. The brush 41 is of greater diameter than and is arranged forward of brush 38. The brushes 38, 41 are driven through the medium of a pair of endless upstanding sprocket chains 43, each having its lower stretch engaging with the top of a sprocket pinion 39 and its forward stretch travelling around the forward side of a sprocket pinion 42. Each chain 43 is operated from a sprocket gear or wheel 26, which, when the sweeper is moved over the surface being cleaned, will be rotated from the axle 23 and drive chain 43.

The springs 31, 36 maintain the sprocket pinions 39 in interengagement with the lower stretch of the chains 43 due to the upward pulling action of the springs on the shaft 37. The brushes 38, 41 travel in the direction of the arrows 44, 45 respectively, and are in contact with each other. The brushes are geared up with a speed ratio to turn faster than the travel of the sweeper when the latter is pushed over a lawn or other surface. The brush 41 is rotated anti-clockwise and the brush 38 clockwise and as the two brushes contact with each other during their operation, the leaves or cut grass are swept against each other and upward whereby the sweepings are carried up between the brushes and into the receptacle 5.

Connected to the bottom 6 is a transversely extending stationary brush 45' for retaining the sweepings in the receptacle.

The bars 20 sustain the receptacle 5 relative to axle 23 and permit the receptacle to sway forwardly and downwardly with the arms 27, 28, 32, and 33 as the brushes become smaller due to the wear thereof. The aforesaid arms maintain the brushes constantly upon the surface which is being cleaned. When completely worn out the brushes may be readily disconnected and non-worn ones substituted.

What I claim is:

1. In a mobile sweeper, a collecting receptacle formed with an intake opening arranged at the lower portion of its front and at the forward portion of its bottom, an axle extending transversely through said receptacle, supporting means for the axle secured to the sides of the receptacle, a pair of wheels carried by said axle exteriorly of the sides of said receptacle, a pair of forwardly extending downwardly inclined arms mounted at their upper ends on said axle between one side of the receptacle and one of said wheels, a second pair of forwardly extending downwardly inclined arms mounted at their upper ends on said axle between the other side of the receptacle and the other of said wheels, one of the arms of each pair being of greater length than the other and connected to the receptacle, shafts journaled in the lower ends of said arms outwardly adjacent said intake opening and provided at their ends with pinions, brushes carried by the shafts and extending through said intake opening into the receptacle, a pair of drives operated from said wheels and coacting with said pinions for driving said brushes in opposite directions, and a resilient connection between the arm of each pair for maintaining the pinions on the shaft mounted in the arms of smallest length in engagement with said drives.

2. In a mobile sweeper, a collecting receptacle including a top, a pair of sides, a front, a bottom and an open back, a closure for said open back hinged to the rear end of said bottom, the lower end portion of the front and the forward end portion of the bottom being cut away to form an intake opening, an axle extending transversely of and projecting from the sides of said receptacle, wheels on the axle provided on their outer sides with sprocket wheels, two pairs of forwardly extending downwardly inclined arms, each pair of arms being mounted on said axle between a wheel and a side of said receptacle, the arms of each pair extending forwardly beyond said intake, one of the arms of each pair being of greater length than the other arm, means for connecting the longest arm of each pair to a side of the receptacle, a brush shaft mounted in the forward ends of the arms of greater length, a brush shaft mounted in the forward ends of the arms of shorter length, said brush shafts provided with pinions at the ends thereof, endless chains operated from said sprocket wheels and engaging with said pinions for revolving said brush shafts in opposite directions, brushes fixed to said shafts and extending through said intake into said receptacle, and means for resiliently connecting a short arm to a long arm for maintaining the pinions on the shaft mounted in the arms of shortest length in engagement with said endless chains.

GEORGE B. RANDOLPH.